Nov. 29, 1966   J. D. CLARY ETAL   3,288,283
ADHESION PROCESS FOR SEPARATING PHOSPHATE FROM CLAY
Filed Feb. 20, 1964
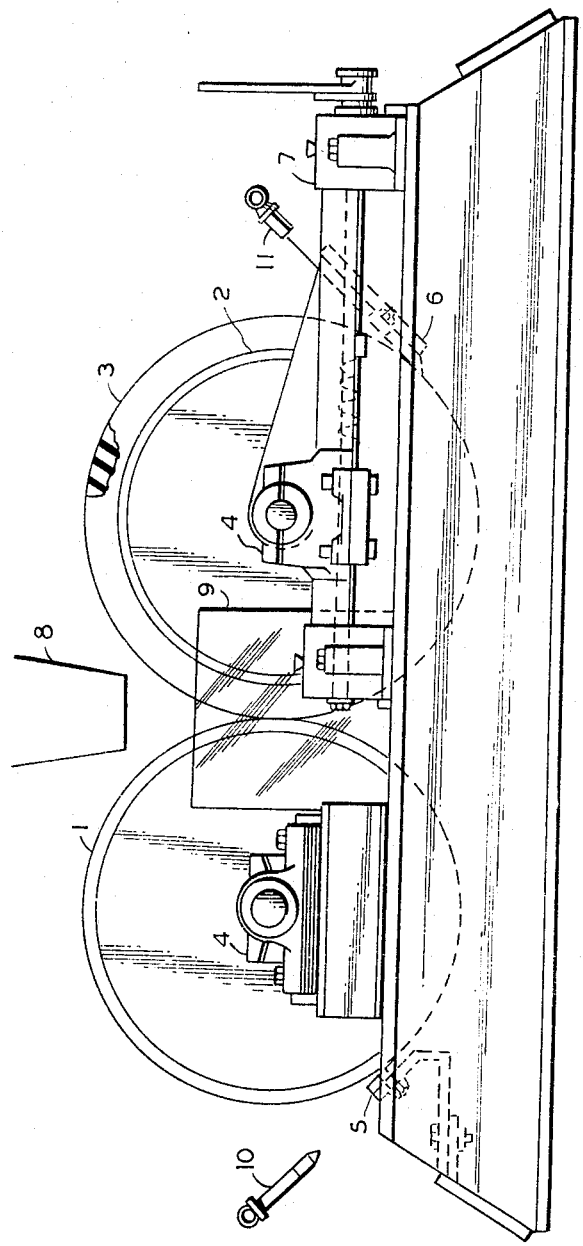
INVENTORS
J. D. CLARY
J. P. MATONEY
BY Kenneth E Prince
ATTORNEY United States Patent Office 3,288,283
Patented Nov. 29, 1966

3,288,283
ADHESION PROCESS FOR SEPARATING
PHOSPHATE FROM CLAY
Joe D. Clary, Lakeland, Fla., and Joseph P. Matoney, Pittsburgh, Pa., assignors to W. R. Grace & Co., New York, N.Y., a corporation of Connecticut
Filed Feb. 20, 1964, Ser. No. 346,132
1 Claim. (Cl. 209—45)

This application is directed to the separation of a mineral ore from a matrix. In particular, this invention is directed to a novel process and combination of apparatus for separating the valuable prosphate rock from the clay and sand contained in naturally occurring phosphate ores.

When phosphate ore is mined from the earth, it is referred to as a matrix. This matrix is comprised of pieces of phosphate rock and silica which are admixed in a clay-like material, which is denoted as slimes. In order to obtain a phosphate rock which is usable in the production of fertilizer products or other phosphorus containing products, it is necessary to remove substantially all of the siliceous and clay-like material from the matrix.

The prior art has disclosed numerous processes and means which have been developed to obtain a phosphate rock which is reasonably free of slimes and silica. In general, most of these processes utilize a complex system of screening and surface washing in conjunction with table and cell flotation steps which further increase the efficiency of the recovery process.

In order to operate an efficient recovery process, the matrix must be disintegrated as much as possible prior to attempting to recover the phosphate rock from the silica and clay. In order to disintegrate the matrix, it is slurried with water and then subjected to a series of screening, abrasion, and washing steps. The matrix will then be disintegrated sufficiently to permit the subsequent removal of the sand and slimes through the use of conventional phosphate recovery processes and apparatus.

A very serious problem which is encountered in using these conventional recovery processes is that of the clay-like and siliceous materials adhering to the surface of the phosphate rock. The operating efficiency of the recovery process is dependent upon the removal of substantially all of these materials from the phosphate rock. An equally serious problem is that the siliceous and clay-like materials which are present in the original phosphate matrix may also take the form of "mud balls." The mud balls are of two types, i.e., an admixture of clay and sand alone, and an admixture of clay, sand, and phosphate rock particles. The mud balls produce extensive clogging and other damage to the screening devices and also result in a loss of a considerable amount of valuable phosphate rock particles. To eliminate these problems, that is to clean the surface of the phosphate rock and to disintegrate and separate the mud balls from the phosphate rock, extended and expensive surface washings and disintegration and separation equipment must be utilized.

It is an object of this invention therefore to provide a novel process and combination of apparatus for separating a mineral ore from a matrix, whereby the above-mentioned problem of the "mud balls" is avoided. Specifically, it is an object of this invention to provide a process for efficiently and thoroughly disintegrating and separating a phosphate rock from the clay-like and siliceous components of the matrix, thereby effectively preparing the matrix for use in a subsequent phosphate recovery process. Other objects, advantages, and features of this invention will be apparent to those skilled in the art in view of the following more detailed description of the invention.

These and other objects are achieved by means of this invention which provides a relatively simple process and combination of apparatus for separating mineral ore from the siliceous and clay-like components of the matrix. Specifically, this invention comprises a pair of roller members spaced a slight distance apart so as to form an apex between the two members and adapted to receive a supply of mineral ore matrix within the apex. At least one of these roller members must have a soft, deformable surface. The roller members also have drive means and scraper means connected thereto to drive the rollers and to remove the clay-like portion of the matrix from the surface of the rollers. This device operates as follows. A mineral ore matrix is fed into the apex of the rotating rollers and flattened while passing through the rollers. The clay-like substance of the matrix will adhere to the surface of at least one of the rollers while the ore will pass freely through the rollers, thereby separating the valuable mineral ore from the siliceous and clay-like portions of the matrix. The clay-like substance will then be removed from the surface of the rollers by the scraper members. By proceeding in the above manner, the problem of the "mud balls" will be minimized to such an extent that the overall efficiency of the recovery process will be enhanced.

The invention will be further understood by referring to the accompanying drawing which illustrates an embodiment of said invention. It should be understood that this drawing is intended only as a means of illustrating the inventive concept and is not to be considered a limitation thereof.

In the drawing, the numeral 1 designates a first roller member while the numeral 2 represents the second roller member which is spaced slightly from the first roller member via a standard type adjustment means, designated generally as 7, so as to form an inverted apex, or nip, to wit, point of tangency or near tangency between the two rollers. The surface of roller 2 is covered with a soft, deformable material, designated as 3. The rollers are driven through the drive mechanism 4. Scraper members 5 and 6 are positioned adjacent roller members 1 and 2 respectively and are adapted to remove from the roller surfaces any material which has adhered thereto. The combination also includes a splash shield 9 to prevent the matrix from extending beyond the length of rollers 1 and 2 and to prevent any water present in the matrix from splashing over the sides of the apparatus.

In general, the process of this invention operates as follows. A phosphate ore matrix is fed continuously from hopper 8 into the apex formed between roller members 1 and 2. As the roller members are rotated via drive means 4, the matrix is pressed and flattened while passing therebetween. As the matrix is flattened, the clay-like portion of the matrix will adhere to the surface of one of the rollers, while the phosphate rock will deform the soft roller and fall freely between the two rollers. In this manner, the phosphate rock will be separated from the clay-like substance of the matrix. The clay-like substance will then be scraped off the surface of the rollers by means of the scraper mechanisms 5 and 6. Water may be sprayed onto the roller surfaces through water jets 10 and 11 to aid in the removal of the clay-like material from the surfaces of the rollers, if desired.

It is important to the success of this invention that at least one of the roller members has a soft, deformable surface. This deformable material can be any soft, deformable plastic material, such as rubber, and should be about at least about 2 inches in thickness, completely covering the circumference of the roller. In the preferred embodiment, the other roller member has a solid, smooth steel surface. When this combination of surfaces is employed, the clay-like portion of the phosphate matrix will flatten when passing between the rollers and will adhere to the steel surface. The phosphate rock will deform the rubber suface and will fall freely between the two rollers where it will be collected and recovered. As an alternative arrangement, this invention also includes an embodiment wherein the surfaces of both rollers are made of this soft, deformable material. When such is the case, the clay-like "mud balls" will be pressed between the two flat surfaces of soft rubber and will adhere thereto, while the phosphate rock product will deform the rubber surfaces and pass between the rollers.

The preferred embodiment of this invention includes a fixed scraper member 5 and a floating scraper member 6. It is to be understood, however, that this is not to be considered a limiting feature of the invention and that scraper members 5 and 6 can be either fixed or floating members. Similarly, although adjustment means 7 is illustrated as connected to roller 2, it is to be understood that this is not a limitation of the invention and that the adjustment means can be connected to roller 1 if desired.

By usage of the above described process and combination of apparatus, it has been determined that an efficient disintegration and separation of the clay-like "mud balls" from the phosphate rock particles can be made. This inventive concept untilizes the basic difference in the hardness or plasticity of the mud balls and the phosphate rock and also the adhering qualities of the clay-like mud balls after being pressed on a smooth surface. By utilizing this concept, it has been found that when the mud balls and phosphate rock particles are pressed between the two surfaces, the mud balls are flattened and adhere to the surfaces while the rock merely deforms the soft surface and is thereby separated from the clay-like substance of the matrix.

As described, the spacing between the two roller members is maintained and adjusted by means of mechanism 7. The exact spacing which is required will vary depending upon the composition of the matrix. For example, if the matrix contains a more coarse rock, the spacing between the rollers will necessarily be greater than if a fine rock size composition is being processed. The size of the spacing will also vary depending upon the particular type of clay-like substance which is contained in the matrix. Thus, the exact spacing will be determinable experimentally. For practical purposes, the spacing can vary from a slight interference, or contact, to a clearance of approximately one inch or more.

When the matrix is fed to the rollers, it will generally be a slurry of approximately 20–40% by weight of matrix in water. However, this is not a limitation of the invention, because the process can be applied to any stream of matrix containing mud balls and rock. It may even be applied to screen products with all the surface water removed.

The speed of rotation of the rollers is variable to a considerable extent. As with the spacing of the rollers, the speed depends upon the composition of the matrix and the particular type of clay which the matrix contains. The exact speed of rotation can be readily determined experimentally for each set of conditions. In most cases, the speed will be in the range of about 10–20 r.p.m. with about 15 r.p.m. preferred.

Subsequent to the separation and disintegration treatment described, the disintegrated matrix material (comprising a physical mixture of phosphate rock, silica, and the clay-like substance) will be subjected to a conventional phosphate recovery system. Usually, the recovery procedure commences with screening of the disintegrated mass to recover substantially all of the phosphate rock which is of a size greater than about 14 mesh (U.S. Standard). This particle size will contain a large phosphate content and is therefore a final product. The material which passes through the initial screening step will then be passed through conventional table and cell flotation steps to recover the small and intermediate size phosphate rock particles.

This invention will be better understood by reference to the following specific but non-limiting example.

*Example*

Florida pebble phosphate ore was removed from the mine, slurried in 20–40% by weight of matrix in water, and pumped through a 16 inch pipe from the mine to the processing plant. The slurry contained particles of up to about 4 inches in diameter. Prior to entering the processing plant, the slurry was passed through the roller members of this invention which were rotating at a speed of about 15 r.p.m. The material obtained from this process contained no substantial amount of mud balls. The phosphate rock material obtained by this procedure was found to possess very high bone phosphate of lime (BPL) values.

Although the process and apparatus of the present invention have been described as being particularly adapted to the separation and disintegration of a phosphate ore matrix, it should be understood that this invention is intended to be usable in the processing of any other mineral ore matrix such as diamonds or barite in which the mineral ore must be separated from a clay-like substance. The scope of this invention is therefore intended to include all such applications.

It is to be understood that many equivalent modifications, such as the use of rotating belts or reciprocating plates (with slurry feeding synchronized to the motion of said plates) in place of the above-described revolving rollers, will be apparent to those skilled in the art.

We claim:

A process for separating a phosphate mineral ore from a clay-like substance which comprises:
 (a) feeding a slurry consisting essentially of about 20–40% by weight of a phosphate mineral ore matrix to a pair of rotating rollers while rotating said rollers at a speed of about 10–20 r.p.m., at least one of said rollers having a soft, deformable surface,
 (b) flattening said matrix while passing said slurry through said rollers, thereby separating the phosphate mineral ore from the clay-like substance of the matrix, said clay-like substance adhering to the surface of one of said rollers while the ore deforms said deformable surface and falls freely from between said rollers,
 (c) removing the clay-like substance from the surface of said rollers, and
 (d) collecting said freely falling ore separately from said clay-like substance.

References Cited by the Examiner

UNITED STATES PATENTS

| | | | |
|---|---|---|---|
| 409,186 | 8/1889 | Friend | 209—46 |
| 1,609,188 | 11/1926 | Pettit. | |
| 2,027,652 | 1/1936 | Raisch | 210—396 X |

FRANK W. LUTTER, *Primary Examiner.*